United States Patent
Turner et al.

[15] 3,653,506
[45] Apr. 4, 1972

[54] LUMBER BIN SORTER WITH VERTICALLY-POSITIONABLE AND TILTABLE BIN FLOORS

[72] Inventors: Donald B. Turner; Albert H. Barnes, both of Portland, Oreg.

[73] Assignee: Moore Dry Kiln Company of Oregon, Portland, Oreg.

[22] Filed: June 12, 1970

[21] Appl. No.: 45,819

[52] U.S. Cl. ............................................. 209/74, 214/6 H
[51] Int. Cl. .............................................................. B07c 3/08
[58] Field of Search .................... 209/74, 73, 125; 214/6 DK, 214/6 H

[56] References Cited

UNITED STATES PATENTS 3,085,686  4/1963  Hanbury ............................ 209/74 UX
3,533,517  10/1970  Heide ................................ 214/6 DK Primary Examiner—Allen N. Knowles
Attorney—Daniel P. Chernoff

[57] ABSTRACT

A lumber bin sorter, of the type having a multiplicity of bins to which graded green lumber is carried by an overhead conveyor and ejected into designated bin locations, wherein each of the bins is provided with a vertically positionable floor member which is raised to the topmost position when the bin is empty and then, as the bin fills up with lumber, the floor indexes successively downward until it reaches the lowest point when the bin is full. The floor, which is guided in its travel by a cam follower mechanism, thereafter tilts downward to provide an opening in the bottom of the bin for dumping its contents onto a conveyor chain traveling underneath. Appropriate sensors, in the form of limit switches and photocells, are provided to generate control signals indicating the arrival of the bin floor at the respective uppermost and lowermost pints of travel and for causing the floor to index downward in response to the progressive filling of the bin with lumber.

3 Claims, 4 Drawing Figures

Patented April 4, 1972  3,653,506

LUMBER BIN SORTER WITH VERTICALLY-POSITIONABLE AND TILTABLE BIN FLOORS

BACKGROUND OF THE INVENTION

This invention relates to improvements in a bin sorter for green lumber of the type wherein similar graded lumber is conveyed and dropped into a designated one of a multiplicity of bin storage locations. More specifically, the invention relates to a bin sorter of the type described wherein the individual bins are provided with a vertically positionable floor or support member which is indexable in increments between an uppermost position, used when the bin is empty, and a lowermost position at which the floor arrives when the bin is full. The apparatus also includes means to tilt the floor for emptying the contents of the bin through its bottom onto a conveyor for removal to another location and associated sensors for generating actuating signals for controlling the travel of the bin floor.

In lumber bin sorters, of the type known to the art and shown for example in Boyle U.S. Pat. No. 3,254,764 and Rambo U.S. Pat. Nos. 2,902,150 and 2,998,133, assorted green lumber is conveyed on a horizontal path by an overhead conveyor and ejected, at the appropriate moment, to fall downward into a predetermined one of a plurality of receiving bins or bin locations assigned to a particular grade and dimension of lumber. Since the variations of lumber width, length, thickness, moisture content, species, grade, and the combinations thereof, are considerable, a typical such sorter would possess a large multiplicity of bin locations, perhaps 20 to 50.

In conventional bin sorters of the type described, the first sticks of lumber dropped into an empty bin location typically fall through a distance of 7 to 8 feet onto a flat, hard floor of a trolley or buggy car, and consequently these initial sticks frequently are damaged and degraded. Furthermore, because of the lengthy fall distance as the bin is initially filled, and the inevitable asynchronous operation of the ejection means which causes one end of the lumber to be dropped ahead of the other from the conveyor into the bin, the lumber sticks tend to jackstraw or randomly align, so that the lumber pile does not build up uniformly in the bin. In an effort to overcome this last-mentioned problem, prior art drop sorters have heretofore commonly been provided with two spaced sets of ejection means for each bin location so that the boards falling into a designated bin location would alternately be dropped first near one wall and then near the other wall of the bin. However, this expedient, while alleviating somewhat the problem of non-uniform buildup, does nothing to prevent the problem of lumber degrade on the initial boards falling into the bin, and the addition of an extra set of ejection elements for each bin location increases the cost and complexity of the sorter apparatus and its associated controls. Furthermore, in conventional lumber bin sorters emptying of the bin contents and their removal to another work station is a time-consuming process involving several workers to minimize downtime and expedite the operation, since it is required that the filled buggy originally positioned in the bin location be wheeled out, moved over to the next station, and its contents emptied, a second buggy wheeled in underneath the sorter to replace it, and a third buggy made ready for standby.

Accordingly, a real need exists in the industry for a lumber drop sorter apparatus of economical and rugged construction which will overcome the aforementioned disadvantages of prior art devices.

SUMMARY OF THE PRESENT INVENTION

The present invention is directed to a bin sorter apparatus of the general type described in which each of the holding bins is provided with a vertically positionable floor support member which can be raised up to the top of the bin when it is empty and thereafter successively indexed downward as the bin fills up with lumber. In the uppermost position the bin floor is only a few feet at most from the conveyor so that the ejected lumber need only fall a relatively short distance before coming to rest on the bin floor, thus virtually obviating the possibility of damage or degrade of the initial boards. Also, as the dropped boards strike against the bin structure and against each other far more gently and fall over a substantially lesser distance, they tend to line up more uniformly and in proper orientation, resulting in a more compacted loading of the bin. Consequently, the provision of a vertically positionable floor in the bin frequently allows the second set of ejection elements to be eliminated at each bin location, thereby effecting considerable savings and also permitting the bins themselves to be made narrower, thus reducing the overall size of the sorter apparatus with attendant further savings in material and space.

When the bin location is completely filled with the bin floor lowered accordingly, the floor can then be tilted downward to form an opening at the bottom permitting the bin contents to be quickly emptied onto a conveyor chain passing underneath for removal and direct infeed to a stacker or other work station remote from the sorter apparatus.

The vertical travel and tilting of the bin floor is guided by a cam follower mechanism, and the travel is controlled by sensors for generating respective control signals upon the floor reaching its uppermost position when empty, as the bin container then progressively fills up with lumber, and finally as it reaches the lowermost position prior to dumping. The cam guide is provided with a fishtail curve on the down-travel end which permits the bin floor, after lowering to the fully loaded index position of the storage bin, to thereafter follow a curved path and cause the floor to tilt in a downward vertical arc to gently dump the contents onto the conveyor underneath. The utilization of a conveyor to carry off the bin contents, rather than a buggy or trolley car as conventional, enables the individual bins of the sorter apparatus to be emptied and quickly replaced into service ready for refilling.

It is therefore a principal objective of the present invention to provide a new and improved bin sorter for lumber and like material which is of more economical design, minimizes the possibility of damage or degrade of the material in the sorting process, builds up a more compact, uniform and aligned pile in the bin, and provides means for more rapidly emptying the filled bin, removing its contents to a subsequent work station and replacing the emptied bin back into operation with considerably less manpower required than with prior art drop sorter systems.

It is a principal feature of the present invention to provide a bin sorter of the type described wherein each of the bins is provided with a vertically positionable and tiltable support floor which may be raised to the topmost position when the bin is emptied and then, as the bin fills up with lumber, the floor indexed successively downward until it reaches the lowest point when the bin is full, and thereafter the floor may be tilted downward to provide an opening in the bottom of the bin for dumping its contents onto a conveyor traveling underneath for their removal to a remote work station.

It is a further feature of the present invention to provide sensors in a bin sorter of the type described to generate actuating signals for controlling the travel of the bin floor and for indicating the fill condition of the bin.

The foregoing and other objectives, features and advantages of the present invention will be more readily understood upon consideration of the following detailed description of the invention, taken in conjunction with the accompanying drawings.

DESCRIPTION OF THE PREFERRED EMBODIMENT

Figure 1:
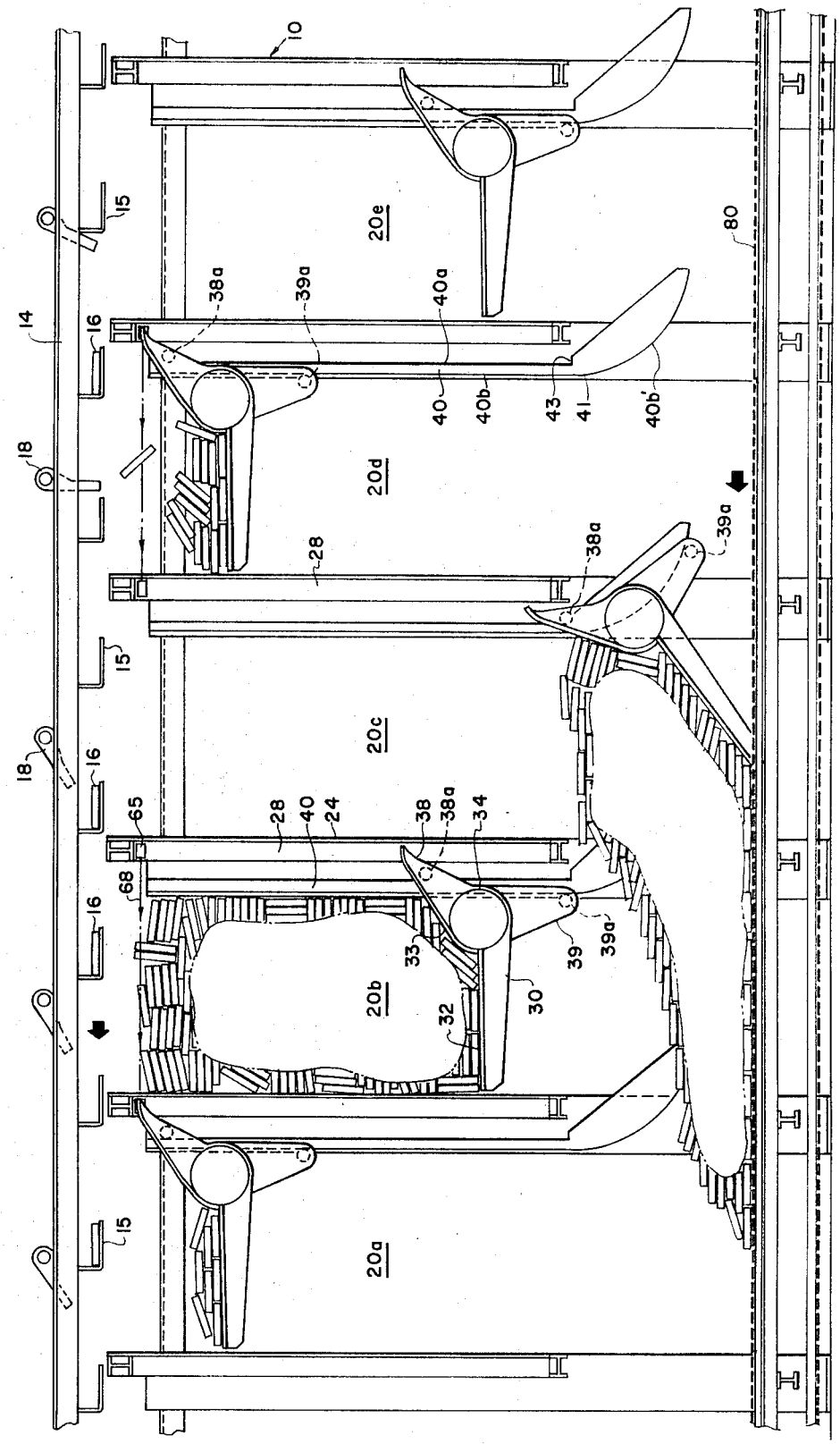
FIG. 1 is a front sectional view of an illustrative embodiment of the lumber bin sorter apparatus of the present invention, showing several individual holding bins at different stages of operation.

Referring to FIG. 1 initially, the bin sorter, designated generally as 10, comprises an overhead conveyor mechanism 14 for delivering individual pieces of graded lumber to a point above a designated bin location and thereafter ejecting the lumber piece into its assigned bin 20. In the fragmentary drawing of FIG. 1, only five bin locations 20a...20e are shown, but this is intended to be representative of a large multiplicity of such bin locations in a typical sorter embodiment. Upon emptying of a particular bin, for example 20c, the contents are dumped onto a conveyor 80 traveling underneath and thereafter carried to a remote work station for stacking or other operation.

Considering now more particularly the major components of the bin sorter system, the overhead conveyor 14 is conventional and formed of a plurality of endless conveyor chains from which are suspended sets of spaced carrier elements or J-bars 15 supporting individual boards 16 aligned transversely to the direction of travel of the conveyor (right to left in FIG. 1). When a given board 16 is directly above its designated bin location, pivotal diverter elements 18 are caused to rotate down so as to be interposed in the path of the board travel (as shown at bin location 20d) and cause the board to slide off its associated carrier bar 16 as the conveyor continues its travel, thus ejecting the board into the assigned bin location. The operation of the respective diverter elements 18 at the appropriate moment to cause the boards to fall into their designated bin locations, so that an individual bin location contains only boards of similar type, is controlled by visual categorization by the operator as to species and grade and by appropriate sensors for automatically determining board dimensions and moisture content located at the infeed of the conveyor, together with associated memory and logic circuitry. Means for effecting the automatic operation of the diverter elements so as to eject boards into their designated bin locations are well known to the art, as shown, for example, in Davies U.S. Pat. No. 3,495,707, and form no part of the present invention. On occasion it will be desirable in certain embodiments of the invention to provide two sets of diverter elements 18 at each bin location, one near the front wall of the bin and the other toward the rear, and their actuation alternated so that successive boards are ejected from the conveyor first near one wall then near the other wall of the bin to improve the uniform buildup of the pile.

Figure 2:
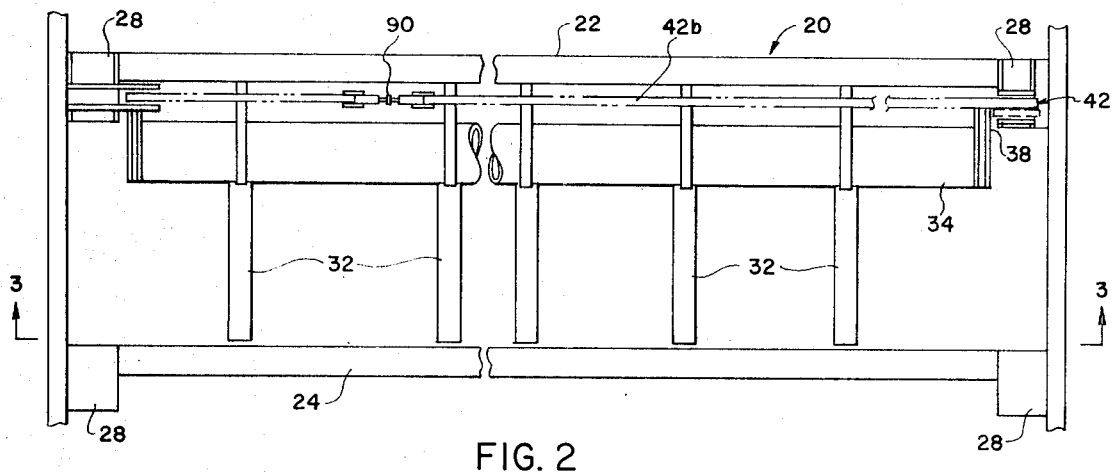
FIG. 2 is a top plan view of an individual holding bin, exemplary of the multiplicity of such bins provided in the sorter apparatus of the present invention, with the overhead conveyor mechanism removed for purposes of clarity.
Figure 3:
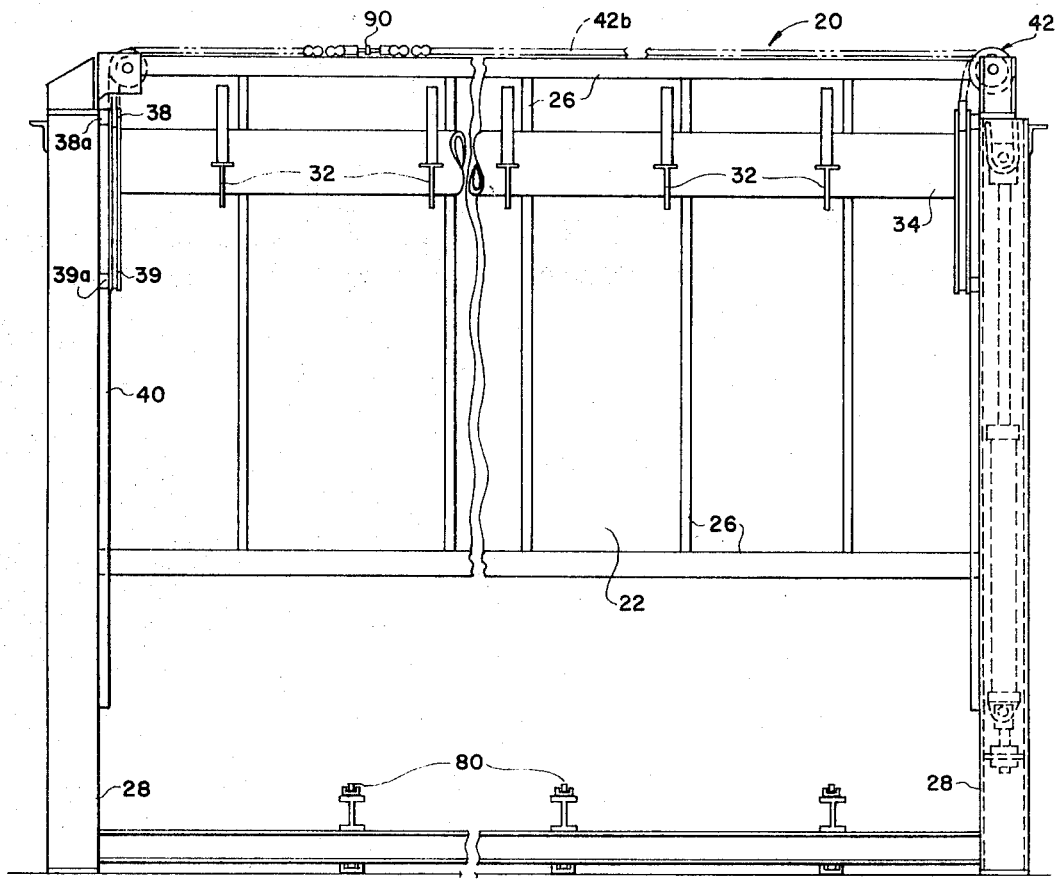
FIG. 3 is an end sectional view of an individual holding bin, taken along the line 3—3 in FIG. 2.

Referring now to FIGS. 2 and 3 in addition to FIG. 1, an individual bin location 20 is in the form of a stall having front and rear walls 22, 24 mounted on a skeletal frame 26 and carried on support stanchions 28. The bottom edge of each wall 22, 24 is elevated above ground to provide adequate clearance for a loaded chain conveyor 80 passing underneath.

A movable floor member 30 is provided in each bin stall, bridging the space between the two vertical walls, to catch and support the boards dropping into the bin. The floor member is formed of a plurality of support arms 32 projecting out from and axially spaced along a common horizontal shaft 34 aligned parallel to the bin walls and supported by a chain mechanism 42 hereinafter described. The floor support arms 30 which project forwardly of the front wall 22 of the bin are preferably each provided with a rearwardly extending shield portion 33 which, in the horizontal position of the support arm, is angled upwardly toward the near wall so as to guide lumber toward the center and prevent boards from jamming between the shaft and the wall. The arms are spaced sufficiently close together, typically on 4-foot centers, so that adequate support is provided for the lumber carried thereon without undue concentration of stress.

Attached to either end of the tubular shaft 34 is a pair of upper and lower radial flanges 38, 39 each carrying an associated roller cam follower 38a, 39a which ride on respective track surfaces 40a and 40b of cam guide 40 carried on the wall stanchion 28. The upper radial flange 38 on each end of the shaft 34 is connected to the supporting cable assembly 42 which raises and lowers the floor member 30 as the cam followers 38a, 39a ride on their respective tracks of the cam guide 40. As the supporting cable is slackened, cam followers 38a, 39a follow a vertical path along their respective tracks 40a, 40b until at a point 41 the track 40b associated with the lower roller 39a enters into the arcuate fishtail portion 40b' of its track. As this is happening the upper roller 38a continues to ride vertically downward on its track 40a, thus causing the floor member 30 to tilt downward. As depicted at bin location 20c in FIG. 1, the travel of the cam follower 39a about the arcuate path portion 40b' of its track, while the other cam follower 38a continues its vertical travel, progressively causes a downward tilting of the support floor 30 in a vertical arc approaching 45° with the horizontal at the end of the cam travel when the upper roller 38a reaches stop 43. Tightening up of the cables 42 causes the floor member 30, moving on its cam followers, to return to the horizontal and thereafter progress vertically upward along the guide 40.

Figure 4:
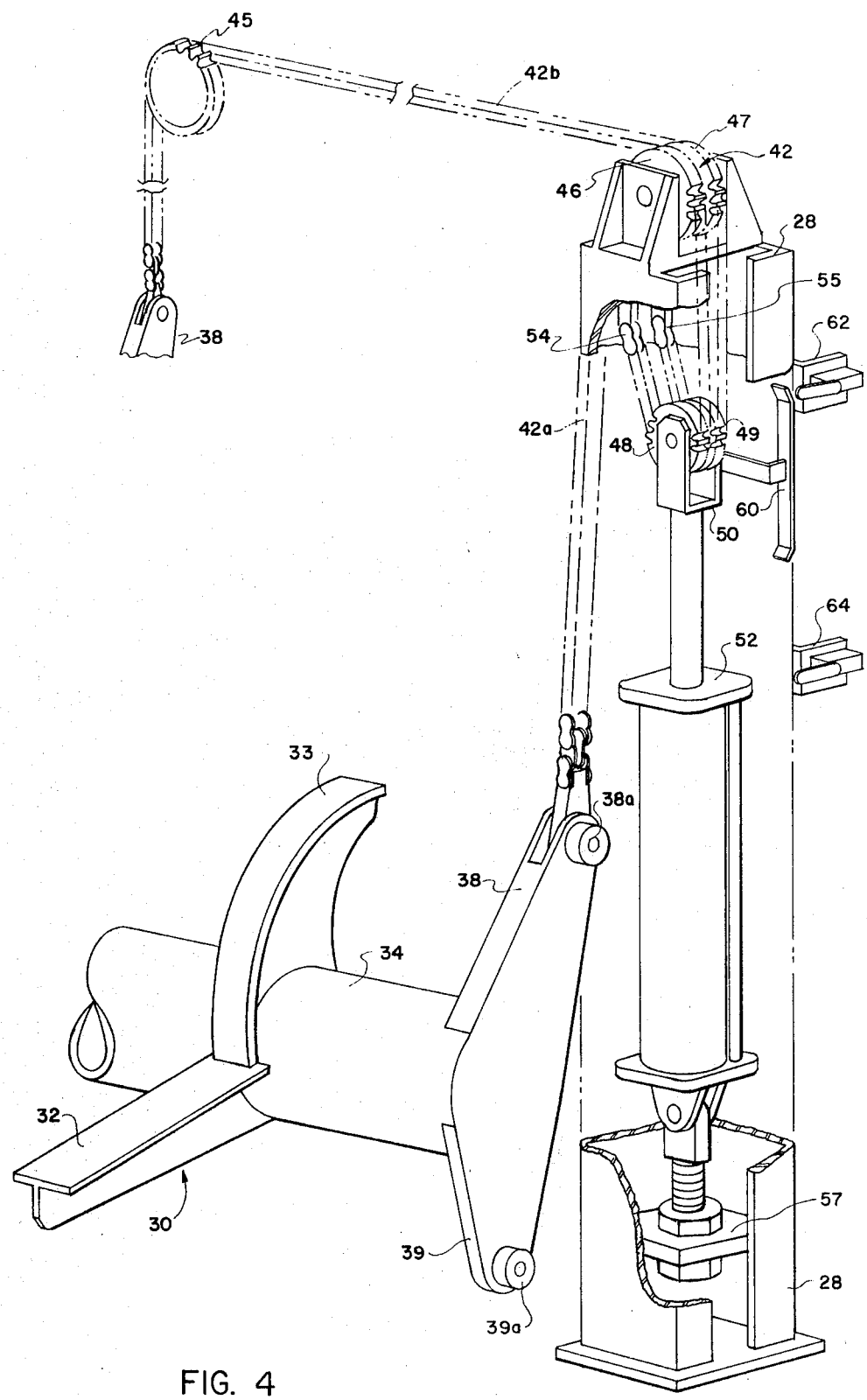
FIG. 4 is an enlarged perspective view, partially broken away and with certain repetitive chain and sprocket elements represented in phantom lines, showing the drive mechanism for the movable bin floor employed in the sorter apparatus of the present invention.

Referring to FIG. 4, which shows details of the cable and drive mechanism for the floor member 30, the pair of upper radial flanges 38 attached to either end of the tubular shaft 34 are connected to a pair of respective support chain cables 42a, 42b. The cable 42b connecting to the far end of the shaft passes over sprocket pulley 45 and thence overhead along the upper edge of the bin wall 22 to come adjacent to the cable 42a attached to the near shaft end. Both cables next pass over a pair of respective sprocket pulleys 46, 47 and then downwardly over a pair of respective sprocket rollers 48, 49 carried on a clevis 50 attached to the rod 51 of a hydraulic actuator 52. In lieu of a hydraulic actuator other suitable means such as a motor-driven winch can be used for reciprocably positioning the sprocket rollers 48, 49. The cables thereafter pass upward to terminate at tie points 54, 55 fastened to the wall stanchion 28. A turnbuckle 90 is preferably provided on chain cable 42b so as to enable the lateral axis of the floor member 30 to be adjusted to a level position. The cylinder end of the actuator 52 is secured to a support member 57 in the wall stanchion and the reciprocating movement of its rod 51 is controlled by suitable flow lines (not shown) connected to the cylinder. The pulley and cable arrangement shown in FIG. 4 provide a 2-to-1 displacement advantage such that a given travel of the piston rod 51 results in a corresponding vertical displacement of twice that amount in the shaft member 34.

The clevis 50 attached to the distal end of the actuator rod carries a projection 60 which is adapted to trip limit switches 64, 62 at respective preselected upper and lower travel limits so as to generate appropriate positional signals for controlling the sorter operation. When the floor member reaches the uppermost point of travel, corresponding to an empty bin situation, a signal is generated by the tripping of switch 64. Similarly the lower limit of vertical travel, at the point prior to dumping when the bin is nearly completely full of boards (corresponding to the situation shown in bin location 20b in FIG. 1), switch 62 is actuated to generate a second signal.

Referring again to FIG. 1, a photocell circuit 65, for sensing the interruption of light beam 68, is provided to scan across the top surface of each of the bin stalls 20. Appropriate electrical circuitry is provided such that temporary interruption of the light beam, such as occasioned by the momentary passage of a dropped board therethrough (as is shown at bin location 20d) does not generate any signal from the photocell circuit. However, upon the continuous interruption of the light beam 68 for a predetermined minimum period of time, e.g., 2 seconds, as occurs when the height of the lumber pile has reached the top of the bin stall, then in that event a control signal is generated by the photosensor. The operation of the bin sorter is such that, upon the receipt of an actuating signal from the photosensor 65, indicating that the level of the boards in the pile forming in that particular bin has reached a predetermined height in the stall, an actuating signal is supplied to the hydraulic actuator 52. The operation of the actuator is controlled by suitable means known to the art such that the control signals generated by the photosensor 65 as the bin fills up causes successive incremental extensions of its piston rod, with consequent successive incremental lowerings of the bin floor 30 over the range of travel of the rod between the positional limit switches 62, 64. Thus, from an initially empty position (depicted at bin location 20a) with the support floor 30 raised to the uppermost position, as boards are ejected into the bin and the pile builds up to the point where the light beam 68 of the photosensor 65 is interrupted by the pile, a control signal is then generated and supplied to the hydraulic actuator 52 to cause the floor to lower to a new position beneath the previous floor location at which the pile height no longer interrupts the light beam. Each subsequent control signal generated by the photosensor will cause the bin floor to index successively downward, in increments, so as to maintain the level of the lumber pile at all times near the top of the bin stall, thereby ensuring that all of the boards drop a minimum distance (on the order of 2 feet or less) as they are ejected from the overhead conveyor. This minimizes the possibility of damage or degrade of the boards in the sorting process and improves the compacted uniform buildup of the pile. As an alternate to the optical sensor provided by the light beam-photocell arrangement, other suitable sensor means, such as one using sonic waves, might feasibly be employed to scan across the top of the bin.

When the bin has become filled with lumber, as indicated by the actuation of the lower limit switch 62 subsequently followed by the pile height causing the interruption of the light beam 68, or alternatively by the generation of an appropriate signal provided by a counter sensing the total number of boards supplied to an individual bin, then an appropriate visual signal such as an indicator light would be generated to indicate to the operator this "bin full" condition. At this lowermost or "pre-dump" position of the bin floor 30 (depicted at bin location 20b) the cam follower 39a associated with the lower radial flange 39 is near the end of its vertical travel and about to descend into the arcuate portion 40b' of the track. In preferred embodiments of the invention the bin floor would remain at this pre-dump position, with appropriate circuitry provided in the control portion of the bin sorter system to inhibit the ejection of further boards into the filled bin until it is emptied and ready for refilling.

Upon the receipt of an operator-generated "bin dump" signal supplied to the actuator 52, the rod arm is further extended in one continuous movement to the limit of its stroke. The consequent slackening of the cables causes the floor 30 to tilt downwardly in a vertical arc in the manner previously described. This tilting action (depicted at bin location 20c) forms an opening in the bottom of the bin permitting the contents to spill out onto the horizontal chain conveyor 80 traveling beneath the bin stalls. The boards are quickly carried off by this conveyor away from the bin stall and onward to a subsequent station. Thereafter, with the contents of the bin now emptied, the action of the hydraulic actuator 52 is reversed to cause the piston arm to retract, thereby tightening up the supporting cables 42 and causing the floor member to move upward (as depicted at bin location 20e), until it again reaches the topmost position (shown at bin location 20a) ready to receive a new supply of boards in the next cycle of bin filling. By virtue of the unique bin floor drive mechanism and conveyor arrangement provided in the sorter system disclosed herein, the dumping of the bin contents and the restoration of the bin ready for refilling is carried out extremely quickly and may be effected automatically following the initiation by the operator of the "bin dump" signal.

The terms and expressions which have been employed in the foregoing abstract and specification are used therein as terms of description and not of limitation, and there is no intention, in the use of such terms and expressions, of excluding equivalents of the features shown and described, or portions thereof, it being recognized that the scope of the invention is defined and limited only by the claims which follow.

What is claimed is:

1. A lumber bin sorter of the type having a multiplicity of bins to which graded lumber is carried by an overhead conveyor and ejected into designated bin locations with at least some of the bins being provided with a floor member vertically movable between a topmost position when the bin is empty and a lowermost position when the bin is filled up with lumber, and having means for providing an opening in the bottom of said bin for dumping its contents, characterized in that sensor means are provided for generating a pair of signals indicating respectively that said floor member has descended to said lowermost position and that the lumber pile formed in said bin has reached a predetermined height, the occurrence of said pairs of signals serving to indicate that said bin is full and ready for dumping.

2. A lumber bin sorter apparatus comprising: an overhead conveyor carrying individual pieces of graded lumber and ejecting pieces of like character into a designated one of a multiplicity of bin storage locations, each of said bin storage locations being formed by a pair of laterally spaced front and rear wall members together with a floor member for catching and supporting lumber pieces dropping into said bin location, said floor member being formed of a plurality of support arms projecting out from and axially spaced along a common horizontal shaft positioned proximate and parallel to one of said bin walls and vertically movable between a topmost position when the bin is empty and a lowermost position when the bin is full, said floor member further containing shielding means secured to said shaft and extending to the nearer of said bin wall pair for guiding falling lumber toward the center of said bin and to prevent boards from jamming between said shaft and said near wall; and operable means for forming an opening in the bottom of said bin for permitting the contents thereof to dump out of said bin.

3. A lumber bin sorter apparatus comprising: an overhead conveyor carrying individual pieces of graded lumber and ejecting pieces of like character into a designated one of a multiplicity of bin storage locations, each of said bin storage locations being formed by a pair of laterally spaced front and rear wall members together with a floor member for catching and supporting lumber pieces dropping into said bin location, said floor member being vertically movable between a topmost position when the bin is empty and a lowermost position when the bin is filled, and formed of a plurality of support arms projecting out from and axially spaced along a common horizontal shaft aligned parallel to said bin walls, with a respective flange member attached at either end of said shaft and containing cam follower means in the form of a pair of rollers riding on respective surfaces of a guide track guiding the path of travel of said floor member, said pair of guide track surfaces being of generally straight parallel orientation over the major part of their length for guiding said floor member in a vertical path between said topmost position and said lowermost position, and over the remaining portion one of said guide track surfaces follows an arcuate path, while the other continues substantially vertically, thereby causing said floor member to tilt downward in a vertical arc so as to form an opening in the bottom of said bin for permitting the contents thereof to dump out of said bin.

* * * * *

UNITED STATES PATENT OFFICE
CERTIFICATE OF CORRECTION

Patent No. 3,653,506  Dated April 4, 1972

Inventor(s) Donald B. Turner; Albert H. Barnes

It is certified that error appears in the above-identified patent and that said Letters Patent are hereby corrected as shown below:

Abstract  Change "pints" to --points--.

Signed and sealed this 25th day of July 1972.

(SEAL)
Attest:

EDWARD M. FLETCHER, JR.  ROBERT GOTTSCHALK
Attesting Officer  Commissioner of Patents